Patented Jan. 27, 1953

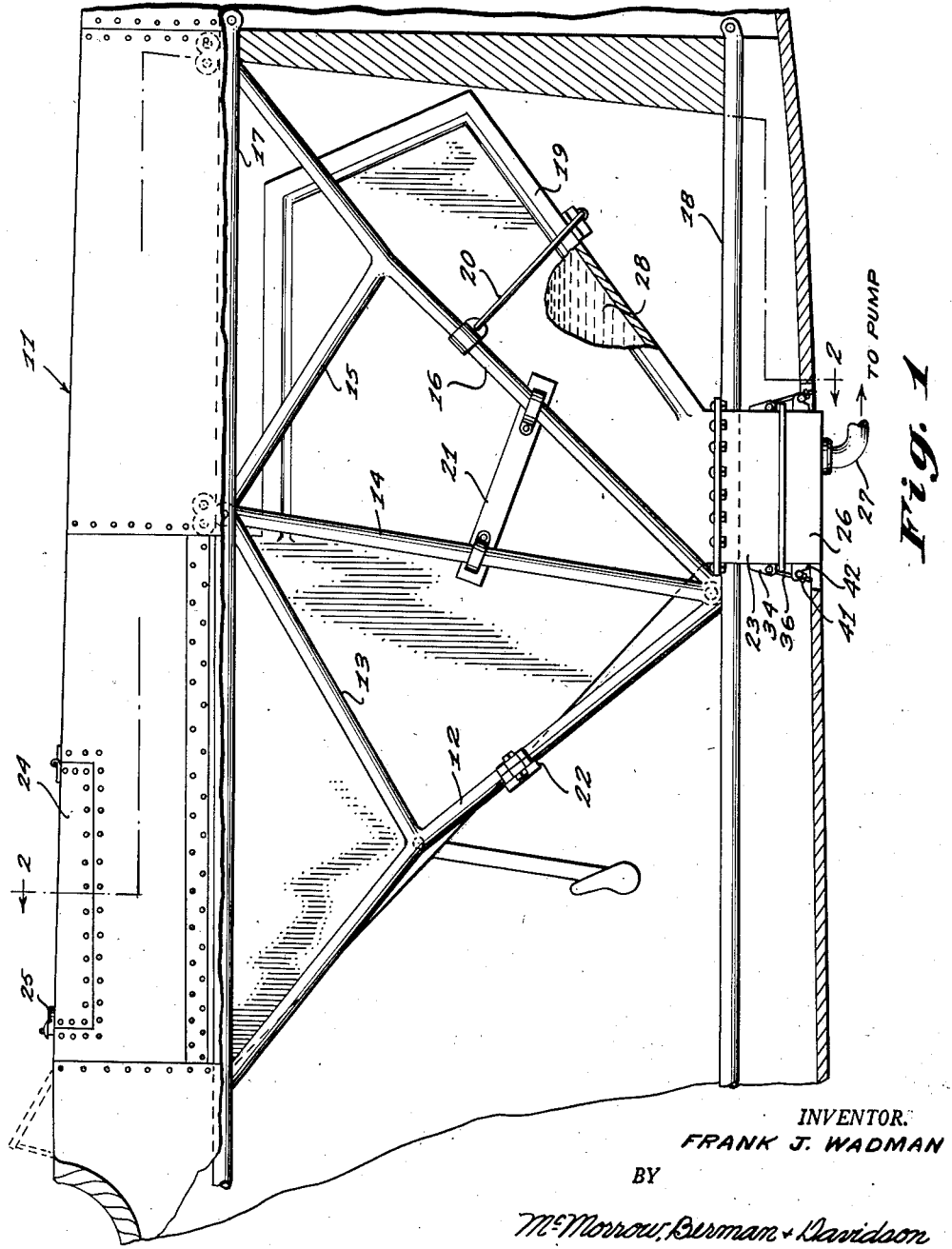

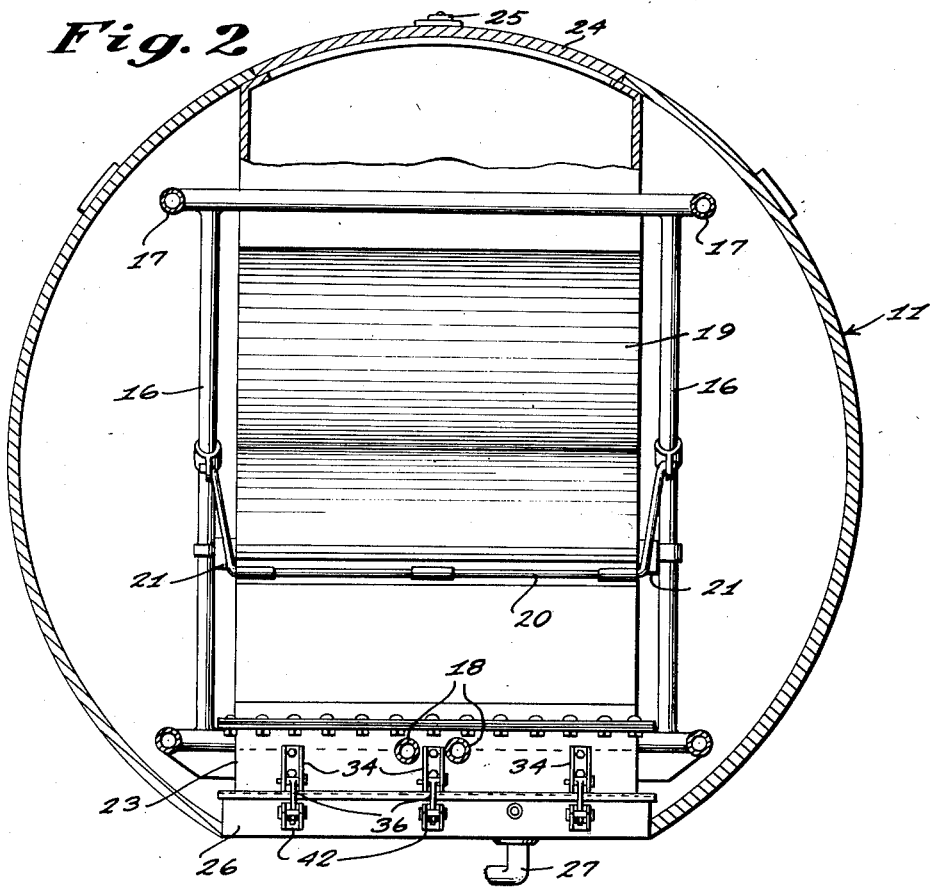
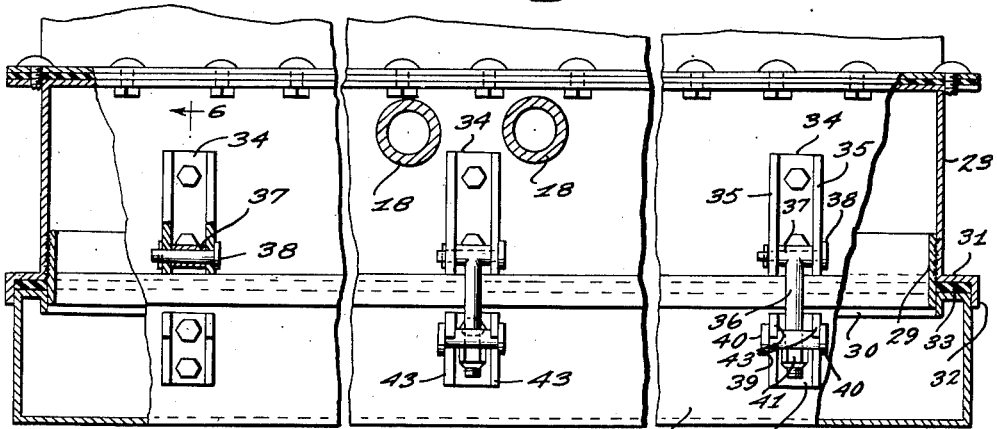

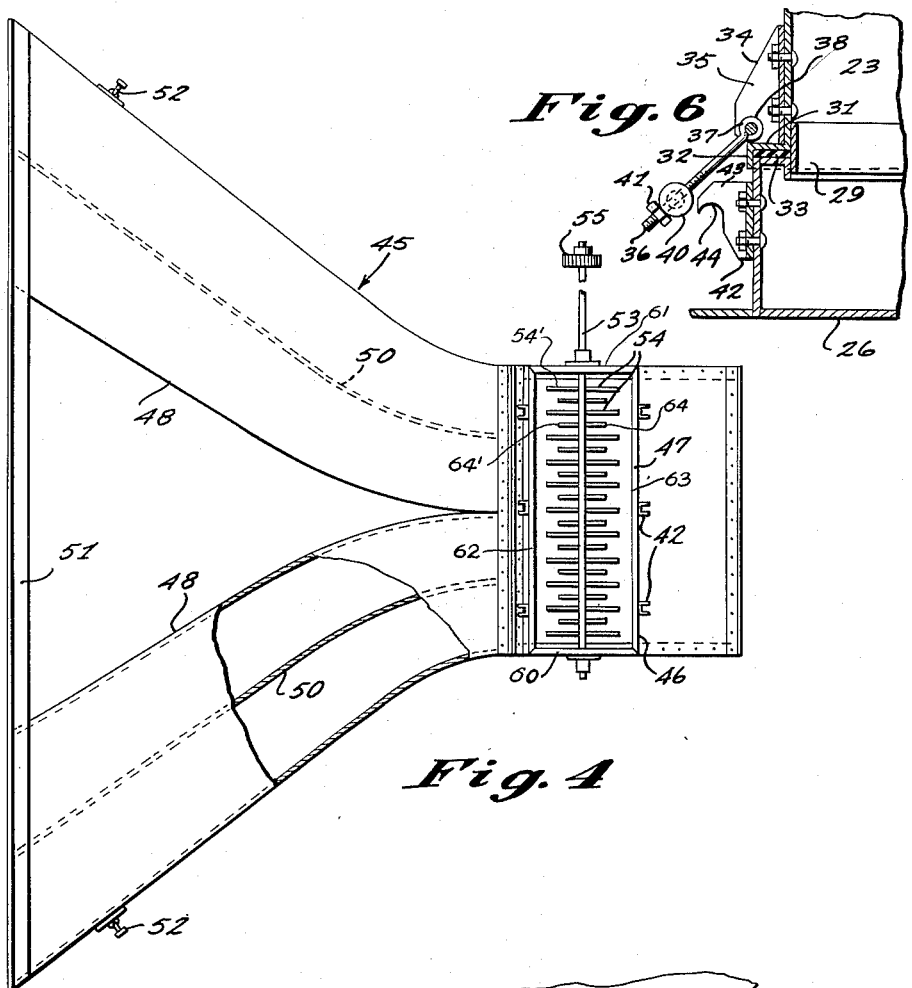
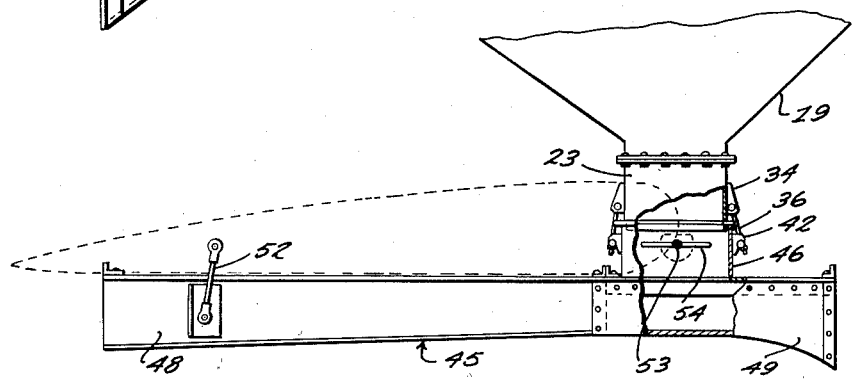

2,626,769

UNITED STATES PATENT OFFICE 2,626,769

AIRPLANE INSECTICIDE SPRAYING AND DUSTING APPARATUS

Frank J. Wadman, Yakima, Wash.

Application July 30, 1948, Serial No. 41,496

2 Claims. (Cl. 244—136)

This invention relates to airplane insecticide spreading equipment and more particularly to insecticide distributing apparatus for airplanes adapted to be quickly converted from a liquid spraying arrangement to a dusting arrangement and vice versa.

A main object of the invention is to provide a novel and improved insecticide distributing apparatus for airplanes which may be readily converted from liquid spraying to dusting and vice versa in a minimum amount of time and with only a small amount of labor, whereby the airplane need not remain out of service for a long period to perform said conversion.

A further object of the invention is to provide an improved mounting for the discharge members of an airplane insecticide distributing installation, said mounting being very simple in construction, compact in size, easy to manipulate when removing or replacing a spray or dusting discharge member, and greatly reducing the amount of time required to convert the apparatus from a liquid spraying arrangement to a dusting arrangement, and vice versa, whereby the cost of operating the airplane over a given period of time is materially reduced.

Further objects and advantages of the invention will become apparent from the following description and claims, and from the accompanying drawings, wherein:

Figure 1 is a fragmentary elevational view, partly in longitudinal cross-section of a portion of the fuselage of an airplane equipped with insecticide distributing apparatus according to the present invention, the apparatus being shown arranged for liquid insecticide spraying, Figure 2 is a transverse vertical cross-sectional view taken on line 2—2 of Figure 1, Figure 3 is an enlarged fragmentary elevational detail view, partly in cross section of the lower portion of the insecticide distributing apparatus shown in Figure 2, showing the means for connecting the discharge member of the apparatus to its supporting mounting at the bottom of the insecticide hopper, Figure 4 is a top plan detail view, partly broken away of a dusting attachment adapted to be employed in place of the liquid spray discharge member employed in Figures 1 to 3.

Figure 5 is a side elevational view, partly in cross-section, showing the dusting attachment of Figure 4 operatively connected to the supporting mounting at the bottom of the insecticide hopper of the airplane, Figure 6 is a cross-sectional detail view taken on line 6—6 of Figure 3.

Referring to the drawings, 11 designates the fuselage of the airplane employed for distributing insecticide. Designated at 12, 13, 14, 15 and 16 are internal strut members of the fuselage, and designated at 17 and 18 are respective longéron members forming part of the framing of the fuselage in combination with said internal strut members. Built into the fuselage 11 is a hopper 19, suitably secured, as by tie rods 20 and bracket members 21 and 22 within the framework defined by said internal strut members. Secured to the bottom of hopper 19 is a rectangular throat member 23, the lower longérons 18 passing through said throat member 23. Provided at the top of the fuselage 11 is a hinged cover 24 which opens into hopper 19, whereby the hopper may be filled with insecticide whenever required. Suitable latch means 25 is provided at the margin of door 24 for locking said door.

Designated at 26 is a discharge member detachably secured to the bottom end of throat member 23 by latch means to be presently described. Discharge member 26 has a bottom outlet conduit 27 connected through a pump, not shown, to a conventional discharge nozzle for converting the insecticide liquid, shown at 28, into a fog or fine spray and expelling same into the slip-stream of the airplane.

The tank or hopper employed in prior art devices of this type is suitable for containing either spray liquid or material in dust form but the device heretofore employed to eject the liquid in the form of a spray is not suitable for the ejection of the dust material. This is also true of the discharge member 26. However, in accordance with the present invention, means are provided for rapidly removing the liquid spray discharge member 26 and replacing same with a dusting member when it is desired to convert the apparatus from liquid spraying to dusting.

It will be seen that throat member 23 has secured to its bottom margin an internal sleeve 29 which fits into an internally flanged top opening 30 of the discharge member 26. Throat member 23 has an outer marginal flange 31 provided with a depending lip 32. A gasket 33 is interposed between flange 31 and the rim of discharge member 26. Secured to the transverse walls of throat member 23 are a plurality of spaced brackets 34 each bracket having parallel vertical spaced flanges 35, 35. Pivotally connected to each bracket between said flanges 35, 35 is a bolt member 36 having a tubular head 37 received between said flanges, a headed pin 38 extending through the flanges and the tubular head 37 whereby pivotal connection of the bolt member 36 is obtained. Slidably mounted on the bolt member 36 transversely thereto is a cross member 39, headed at both ends, as shown at 40, 40, and adjustably retained on the bolt member by a nut 41 threaded on said bolt member. Secured to the transverse walls of the discharge member 26 are spaced bracket members 42, aligned with the respective brackets 34 of the throat member, the bracket members 42 being formed with spaced vertical flanges 43, 43. The flanges 43, 43 are formed with downwardly facing arcuate notches 44 adapted to receive the cross member 39 of the associated bolt member 36. When the discharge member 26 is installed, the nuts 41 are first loosened to allow the cross members 39 to be swung around the flanges 43, 43 of the subadjacent bracket members 42 so that said cross members may be positioned beneath the arcuate notches 44. The nuts 41 are then tightened securing the discharge member 26 firmly to the bottom of the throat member 23.

Referring now to Figures 4 and 5, 45 generally designates a dusting attachment adapted to be connected to the bottom of the throat member 23 in place of the liquid discharge member 26. Attachment 45 comprises an upstanding rectangular intake throat member 43 formed with a rim 47 receivable between the sleeve 29 and lip 32 of the throat member 23 and provided with the spaced bracket members 42 identical with those carried by the discharge member 23 and described above. Said brackets are aligned with the brackets 34 of the throat member, and the cross members 39 are engageable with the arcuate notches 44 of the brackets 42 to secure the conduit portion 46 firmly to the throat member 23. The throat member 46 includes spaced end walls 60, 61 and spaced side walls 62, 63 interposed between the end walls 60, 61 and secured therebetween.

The body of the attachment 45 comprises a pair of elongated laterally flaring rear discharge nozzle portions 48, 48 converging forwardly to a junction beneath conduit 46, the forward portion of said body comprising a downwardly and forwardly flared intake nozzle 49. As shown in Figure 5, the rear elongated discharge nozzles 48, 48 flare vertically, as well as horizontally. It will be apparent from Figure 5 that intake nozzle 49 together with the discharge nozzles 48, 48 define a venturi, the intake conduit 46 being connected to the venturi at its neck portion.

The discharge nozzles 48, 48 are provided with medium vertical partition walls 50 dividing each discharge nozzle into two substantially identical portions.

A transverse rigid bar member 51 connects the ends of the discharge nozzles 48, 48 to rigidify the structure of the attachment 45. The rear side portions of the nozzles 48, 48 may be detachably connected by supporting rods 52, 52 to the undersurface of the airplane fuselage or to suitable points on the airplane wings.

Journalled transversely in the conduit portion 46 is a shaft 53 provided with main agitator teeth 54, 54'. As clearly shown in Figure 4 the main agitator teeth 54 are arranged in a first group which is disposed transversely of and projects from the shaft 53 contiguous to one side thereof. The teeth 54 of the first group each have one end secured to the shaft 53 and have the other end terminating contiguous to and spaced from the side wall 63 of the throat member 46. The teeth 54' are arranged in a second group which is disposed transversely of and projects from the shaft 53 contiguous to the other side thereof, the teeth of the second group having one end secured to the shaft and having the other end terminating contiguous to and spaced from the side wall 62 of the throat member 46. Interposed between adjacent main agitator teeth 54, 54' of the first and second groups are the auxiliary agitator teeth 64, 64'. The auxiliary agitator teeth 64 each have one end secured to the shaft 53 and have the other end terminating contiguous to and spaced inwardly of the free end of the main agitator teeth 54. Likewise the auxiliary agitator teeth 64' each have one end secured to the opposite side of the shaft 53 and have the other end terminating at a point spaced inwardly of the other end of the main agitator teeth 54'. Shaft 53 is provided with a drive gear 55 which may be coupled to suitable drive means (not shown) on the airplane for rotating shaft 53. In operation, the insecticide dust contained in hopper 19 gravitates downwardly into conduit portion 46 and is agitated by the radial teeth 54, whereby the dust is maintained in a loose condition. Air flowing into intake nozzle 49 carries the dust rearwardly through the discharge nozzles 48, 48 and is accelerated by Venturi action. The dust is discharged in the form of a wide dust cloud behind the moving airplane and settles over the area being treated.

From the above description it will be apparent that in order to change from one type of spray to another it is only necessary to remove the original ejection device secured to the bottom of throat member 23 and replace it with the required ejection device, and retighten the nuts 41. In the case of the dusting attachment, the only additional manipulation required is the securement or disengagement of the supporting rods 52, 52 to or from the airplane and the coupling or uncoupling of the agitator shaft 53 to or from the drive means on the airplane. The required conversion may be made on the landing strip or temporary landing field and does not require special tools or hangar facilities.

While the specific embodiment of an insecticide distributing apparatus for airplanes has been disclosed in the foregoing description, it will be understood that various modification within the spirit of the invention may occur to those skilled in the art. Therefore it is intended that no limitations be placed on the invention except as defined by the scope of the appended claims.

What is claimed is:

1. In an airplane including a fuselage having a material distributing device arranged longitudinally of said fuselage and dependingly supported from the latter, a hopper positioned above and spaced from said distributing device for the reception of a powdered insecticide therein, a vertically disposed throat member rectangular in cross section interposed between said distributing device and said hopper and having one end in communication with said distributing device and having the other end in communication with said hopper, agitating means arranged transversely of said throat member adjacent the point of communication with said distributing device and rotatably mounted on said throat member, and power means operatively connected to said agitating means for effecting rotation of the latter to thereby keep said powdered insecticide in a loosened condition as it gravitates downwardly for distribution by said distributing device, said agitating means comprising a horizontally disposed shaft extending between the end walls of said throat member and rotatably journaled therebetween, a first group of spaced main agitating teeth disposed transversely of and projecting from said shaft contiguous to one side thereof and having one end secured thereto and having the other end terminating contiguous to and spaced from the adjacent side wall of said throat member, and a second group of spaced main agitating teeth disposed transversely of and projecting from said shaft contiguous to the other side thereof and having one end secured thereto and having the other end terminating contiguous to and spaced from the other side wall of said throat member.

2. In an airplane including a fuselage having a material distributing device arranged longitudinally of said fuselage and dependingly supported from the latter, a hopper positioned above and spaced from said distributing device for the reception of a powdered insecticide therein, a vertically disposed throat member rectangular in cross section interposed between said distributing device and said hopper and having one end in communication with said distributing device and having the other end in communication with said hopper, agitating means arranged transversely of said throat member adjacent the point of communication with said distributing device and rotatably mounted on said throat member, and power means operatively connected to said agitating means for effecting rotation of the latter to thereby keep said powdered insecticide in a loosened condition as it gravitates downwardly for distribution by said distributing device, said agitating means comprising a horizontally disposed shaft extending between the end walls of said throat member and rotatably journaled therebetween, a first group of spaced main agitating teeth disposed transversely of and projecting from said shaft contiguous to one side thereof and having one end secured thereto and having the other end terminating contiguous to and spaced from the adjacent side wall of said throat member, a second group of spaced main agitating teeth disposed transversely of and projecting from said shaft contiguous to the other side thereof and having one end secured thereto and having the other end terminating contiguous to and spaced from the other side wall of said throat member, and an auxiliary agitating tooth interposed between adjacent main agitating teeth of said first and second groups and each having one end secured to said shaft and having the other end terminating contiguous to and spaced inwardly of said other ends of said main agitating teeth.

FRANK J. WADMAN.

REFERENCES CITED

The following references are of record in the file of this patent:

UNITED STATES PATENTS

| Number | Name | Date |
|---|---|---|
| 166,412 | Rote | Aug. 3, 1875 |
| 568,776 | Leggett | Oct. 6, 1896 |
| 916,728 | Leggett | Mar. 30, 1909 |
| 1,433,026 | Myers | Oct. 24, 1922 |
| 1,674,048 | Lang | June 19, 1928 |
| 1,691,205 | Morse | Nov. 13, 1928 |
| 1,703,308 | Johnson | Feb. 26, 1929 |
| 1,722,467 | Huff | July 30, 1929 |
| 1,749,504 | Pelton | Mar. 4, 1930 |
| 2,120,961 | Beede | June 21, 1938 |
| 2,427,987 | Wilson | Sept. 23, 1947 |
| 2,306,380 | Durning | Dec. 29, 1942 |

FOREIGN PATENTS

| Number | Country | Date |
|---|---|---|
| 27,409 | Netherlands | June 16, 1932 |